United States Patent
Potter et al.

(10) Patent No.: US 10,425,151 B2
(45) Date of Patent: Sep. 24, 2019

(54) SYSTEM AND METHOD FOR OPTIMIZING SATELLITE GATEWAY DIVERSITY

(71) Applicant: Kratos Integral Holdings, LLC, San Diego, CA (US)

(72) Inventors: Robert Potter, Los Altos, CA (US); Jean Marc Lefebure, San Diego, CA (US); Roopa Shankar, San Diego, CA (US); Stuart Daughtridge, Huntingtown, MD (US)

(73) Assignee: Kratos Integral Holdings, LLC, San Diego, CA (US)

( * ) Notice: Subject to any disclaimer, the term of this patent is extended or adjusted under 35 U.S.C. 154(b) by 0 days.

(21) Appl. No.: 16/164,618

(22) Filed: Oct. 18, 2018

(65) Prior Publication Data
US 2019/0123811 A1 Apr. 25, 2019

Related U.S. Application Data

(60) Provisional application No. 62/575,270, filed on Oct. 20, 2017.

(51) Int. Cl.
*H04B 7/185* (2006.01)
*H04B 7/0408* (2017.01)
(Continued)

(52) U.S. Cl.
CPC ....... *H04B 7/18534* (2013.01); *H04B 7/0408* (2013.01); *H04B 7/0426* (2013.01);
(Continued)

(58) Field of Classification Search
CPC .............. H04B 7/18534; H04B 7/1851; H04B 7/0426; H04B 7/061; H04B 7/18513
See application file for complete search history.

(56) References Cited

U.S. PATENT DOCUMENTS 9,319,105 B2 * 4/2016 Aryanfar ............. H04B 5/0025
2004/0146038 A1 7/2004 Dale et al.
(Continued)

FOREIGN PATENT DOCUMENTS

EP 1091506 A2 4/2001
EP 2285173 A2 2/2011
(Continued)

OTHER PUBLICATIONS

International Search Report and Written Opinion for corresponding PCT application No. PCT/US2018/056684, dated Jan. 31, 2019, in 13 pages.

*Primary Examiner* — Brandon J Miller
(74) *Attorney, Agent, or Firm* — Procopio, Cory, Hargreaves & Savitch LLP

(57) ABSTRACT

Systems, devices, and methods for satellite communications are disclosed. The devices and methods can be used for communications diversity in a system having multiple radio frequency terminals (RFTs). In a transmit chain, each RFT can be associated with an antenna for the transmission of signals to a satellite. The system can select one or more uplinks for transmission of one or more versions of a transmit signal via associated antennas. The one or more versions can have a piggyback signal associated with and phase locked to a symbol rate of the transmit signal. In a receive chain, phase differences between the piggyback signals can allow adjustment of one or more time delays in the transmit chain to provide improved signal to noise ratio of the received versions of the transmit signal in the receive chain.

20 Claims, 5 Drawing Sheets

(51) Int. Cl.
*H04B 7/0426* (2017.01)
*H04B 7/06* (2006.01)

(52) U.S. Cl.
CPC ........... *H04B 7/061* (2013.01); *H04B 7/1851* (2013.01); *H04B 7/18513* (2013.01)

(56) References Cited

U.S. PATENT DOCUMENTS

2013/0109299 A1* 5/2013 Roos .................. H04B 7/18528 455/12.1
2017/0366251 A1* 12/2017 Ravishankar ...... H04B 7/18513

FOREIGN PATENT DOCUMENTS

| EP | 3097673 B1 | 9/2017 |
| WO | 03/017518 A1 | 2/2003 |
| WO | 2017/124004 A1 | 7/2017 |

* cited by examiner

SYSTEM AND METHOD FOR OPTIMIZING SATELLITE GATEWAY DIVERSITY

CROSS-REFERENCE TO RELATED APPLICATIONS

This application claims priority to U.S. Provisional Application Ser. No. 62/575,270, filed Oct. 20, 2017, entitled, "SYSTEM AND METHOD FOR OPTIMIZING SATELLITE GATEWAY DIVERSITY," the contents of which are hereby incorporated by reference in their entirety.

BACKGROUND

Technical Field

This disclosure relates to satellite communications. More specifically, this disclosure relates to antenna diversity and optimization in the selection of ground stations for transmit and receive operations associated with a transmit signal containing multiple constituent signals or channels.

Related Art

In some examples, a wideband signal satellite communication signal (e.g., in the Ka band) can produce symbol rates in excess of 200 million symbols per second. This magnitude can require very large antennas, sometimes in excess of nine meters (m) to achieve necessary link budget requirements.

Ground station diversity or site diversity can provide switching between antenna sites for transmission and reception of satellite signals to avoid weather and equipment failures and optimize efficiency. Digital intermediate frequency (IF) technology can enable fast signal routing and therefore can increase efficient use of ground stations to increase power, link margin, and thus throughput on both the uplink (transmissions to a satellite) and downlink (transmissions from a satellite). Uplink and downlink communications from the satellite can be improved by signal combining of the digitized IF signals. Similarly, uplink communications can be improved by using digital IF to route signals to optimize use of diverse amplifier/antennas systems for transmission.

However, signal attenuation at very high (e.g., Ka band) frequencies due to rain or high water content (e.g., rain fade) in the air necessitates other, very large backup antennas for diversity switching. This may be necessary to ensure communication when experiencing rain fade at the primary antenna. Therefore, multiple smaller, spatially diverse antennas with active signal combining at one or both of the satellite and the ground station, can provide a performance enhancement as well as reduce susceptibility to rain fade. Accordingly, a single large antenna can, in some examples, be replaced by multiple smaller, and less expensive, antennas. The multiple smaller antenna systems can be less than half the cost of the two very large antennas while providing the same performance and rain fade protection.

SUMMARY

This disclosure addresses systems and methods for satellite communications using downlink site diversity and uplink transmit power management. A plurality of ground stations can include a piggyback signal in transmissions to ensure coherent reception of multiple versions of a signal using site diversity.

An aspect of the disclosure provides a method for operating a radio frequency terminals (RFT) in a satellite communications system having multiple RFTs. Each RFT can be associated with an antenna. The method can include receiving, via a satellite from a first RFT, a first version of a transmit signal having a first piggyback signal phase-locked with a symbol rate of the transmit signal. The method can include receiving, via the satellite from a second RFT, a second version of the transmit signal having a second piggyback signal phase-locked with the symbol rate of the transmit signal. The method can include determining a phase offset between the first version of the transmit signal and the second version of the transmit signal based on a phase difference between the first piggyback signal and the second piggyback signal. The method can include transmitting an adjustment message to the first RFT and the second RFT based on the phase offset, the adjustment message including a time correction for the first version and the second version.

Another aspect of the disclosure provides a device for satellite communications using site diversity in a system having multiple radio frequency terminals (RFTs), each RFT being associated with an antenna. The device can include an antenna. The antenna can receive, via a satellite from a first RFT, a first version of a transmit signal having a first piggyback signal phase-locked with a symbol rate of the transmit signal. The antenna can receive, via the satellite from a second RFT, a second version of the transmit signal having a second piggyback signal phase-locked with the symbol rate of the transmit signal. The device can have one or more processors coupled to the antenna. The one or more processors can determine a phase offset between the first version of the transmit signal and the second version of the transmit signal based on a phase difference between the first piggyback signal and the second piggyback signal. The one or more processors can transmit, via the antenna, an adjustment message to the first RFT and the second RFT based on the phase offset, the adjustment message including a time correction for the first version and the second version.

Another aspect of the disclosure provides a non-transitory computer readable medium comprising instructions that when executed by a processor, cause a computer to receive, via a satellite from a first RFT, a first version of a transmit signal having a first piggyback signal phase-locked with a symbol rate of the transmit signal. The non-transitory computer readable medium can further cause the computer to receive, via the satellite from a second RFT, a second version of the transmit signal having a second piggyback signal phase-locked with the symbol rate of the transmit signal. The non-transitory computer readable medium can further cause the computer to determine a phase offset between the first version of the transmit signal and the second version of the transmit signal based on a phase difference between the first piggyback signal and the second piggyback signal. The non-transitory computer readable medium can further cause the computer to transmit an adjustment message to the first RFT and the second RFT based on the phase offset, the adjustment message including a time correction for the first version and the second version.

Other features and benefits will be apparent to one of skill in the art with a review of the following description.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

Figure 1:
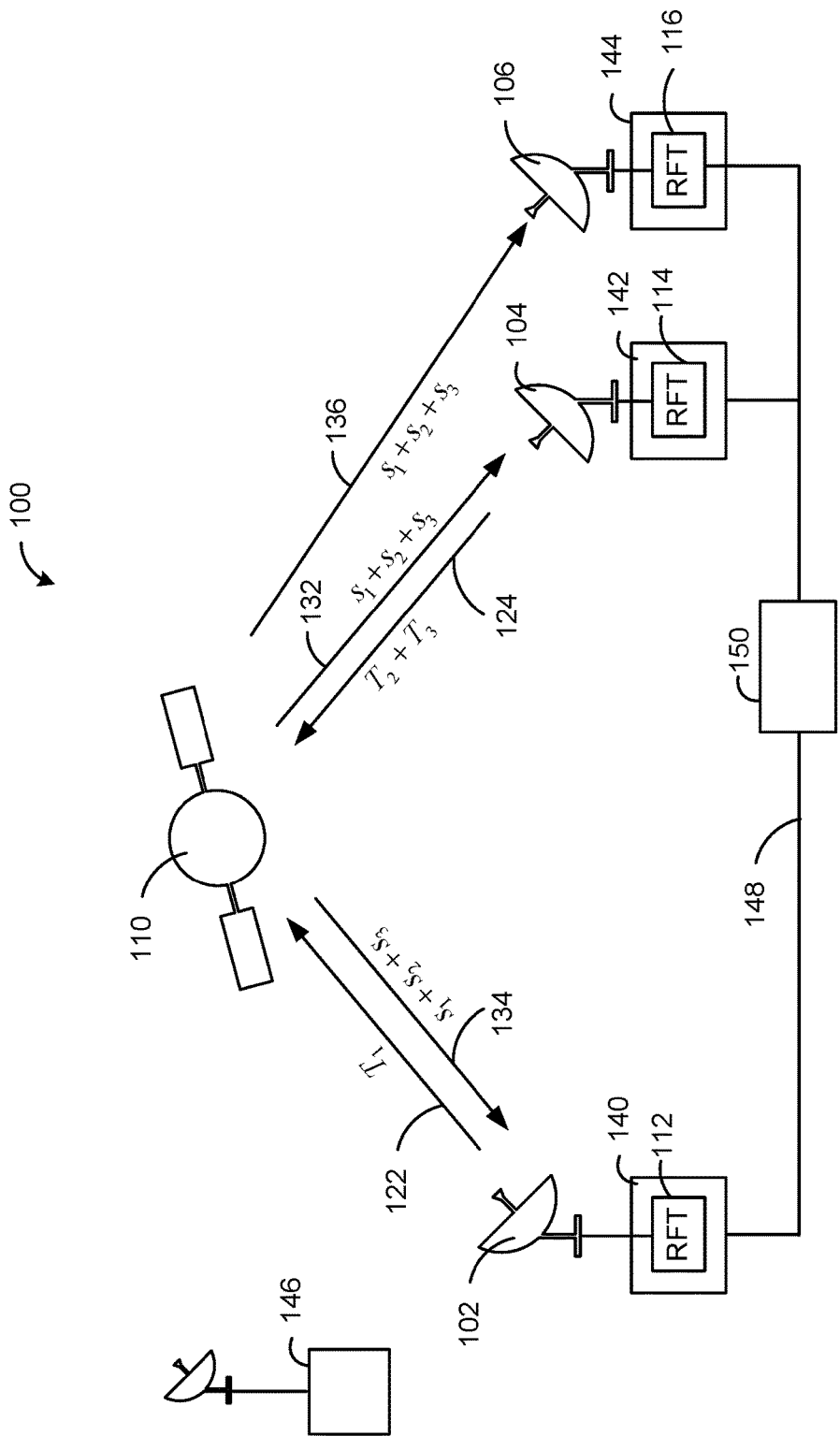
FIG. 1 is a graphical depiction of an embodiment of satellite communications between a plurality of ground stations.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Antenna or site diversity can be used to switch between transmission and reception sites to avoid or mitigate signal degradation, for example, from weather, and/or equipment failures. Antenna diversity, space diversity, spatial diversity, or site diversity, as referred to herein can use one or more of several wireless diversity schemes using two or more antennas to improve the quality and reliability of a given wireless communication link.

Antenna or site diversity can take advantage of a signal that is available within a coverage region. Downlink communications from the satellite can be improved by combining multiple iterations of signals. Similarly, uplink communications can be improved by using digital IF to route signals among multiple antennas to optimize use of diverse amplifier/antennas systems for transmission.

Antenna diversity can be effective for mitigating weather, local interference and other impacts to signals for both the uplink and downlink. This is because multiple antennas offer a receiver several observations of the same signal to be received at different antennas and combined. Each antenna can experience a different weather and interference environment. Thus, if one antenna is experiencing a deep fade, it is likely that another has a sufficient signal. Collectively and cooperatively, such a system can provide a robust uplink and downlink. While this is primarily seen in receiving systems (diversity reception), the same has also proven valuable for transmitting systems (transmit diversity) as well. Multiple antennas can provide more than just receive diversity, but performance improvements when antennas are not impaired. In an exemplary two-antenna arrangement, some diversity implementations have a primary antenna and one backup antenna. An exemplary benefit of embodiments described herein provide twice the uplink and downlink throughput when both antennas have clear skies and drop back to normal performance when bad weather. As described herein, management of transmit and receive operations can match or exceed the gains of the downlink signal combining.

In some embodiments disclosed herein, site diversity can be implemented using digital intermediate frequency (IF) technology to allow more efficient use of satellite ground stations to increase power, link margin, and data throughput on both the uplink to a satellite and downlink from the satellite. In the disclosed embodiments, downlink communications can be improved by combining received digitized IF signals from multiple antennas. Uplink communications can be improved by using digital IF to route signals among ground stations and their associated antennas to optimize the use of a plurality of amplifiers associated with different ground stations. Advantageously, digital IF routing provides precise timing and extremely fast switching between sites to maximize throughput and minimize the impact in data loss from a switching event.

FIG. 1 is a graphical representation of an embodiment of satellite communications between a plurality of ground stations. A communication system ("system") 100 includes a plurality of ground stations 140, 142, 144, 146 communicating with one another via a satellite 110. In some embodiments, the communication system 100 may comprise more than the four ground stations 140, 142, 144, 146 shown and more than one satellite 110. The ground stations 140, 142, 144, 146 may generally be geographically separated. The ground station 146 is shown further away from the ground stations 140, 142, 144 and may be referred to herein as a distant ground stations 146. In some example, the ground stations 140, 142, 144 may be geographically separated but still within the same satellite beam.

The ground station 140 may transmit a signal 122 ($T_1$) to the satellite 110 that is then relayed to the ground stations 142, 144. The ground station 142 may transmit two signals 124 ($T_2+T_3$) to the satellite 110 that are relayed to the ground station 140 and the ground station 144. The ground station 140 may receive the signals 124 ($T_2+T_3$) and an echo of its own transmitted signal 122 ($T_1$) as a composite signal 134 (shown as, $S_1+S_2+S_3$). Similarly, the ground station 142 may receive the signal 122 ($T_1$) and an echo of its own transmitted signals 124 ($T_2+T_3$) as a composite signal 132 (shown as $S_1+S_2+S_3$). As used in FIG. 1, the "T" indicates a transmitted signal (e.g., uplink) while the "S" indicates a corresponding signal received (e.g., downlink) at one or more of the ground stations 140, 142, 144. The ground station 144 does not transmit a signal of its own.

The signal 122 ($T_1$) and the signal 124 ($T_2$) together, as received by the ground station 144, is referred to as a composite signal 136. The composite signal 136 may be similar to the composite signal 132 and the composite signal 134, being a combination of three signals, $S_1+S_2+S_3$. In some embodiments, either or both of the signal 122 and the signals 124 can be signals of interest for the ground station 144. In some embodiments, the ground station 144, in addition to the ground stations 140, 142 can implement certain interference mitigation or signal separation methods in order to extract signal(s) of interest from the received composite signal 136 or the signals 132, 134. Some such interference mitigation or signal separation methods may be those disclosed by U.S. Pat. Nos. 9,219,631 and 9,130,624, both of which are hereby incorporated by reference in their entirety.

Each of the ground stations 140, 142, 144, 146 can have a radiofrequency (RF) terminal (RFT) and one or more antennas. The systems/equipment from the antennas to digital IF units for both the up and downlink chains collectively can be referred to as an RFT. The size of the antennas and the capabilities of the RFT may or may not be the same. In some examples, one RFT can have a corresponding antenna. For example, the ground station 140 can have an antenna 102 and an RFT 112. The ground station 142 can have an antennas 104 and an RFTs 114. The ground station 144 can have an antenna 106 and an RFT 116. The distant ground station 146 can have an antenna 230. Each of the ground stations 140, 142, 144 can be communicatively coupled together via a terrestrial network 148. The terrestrial network 148 can be the Internet, for example. In some embodiments, the distant ground station 146 may not be coupled to the terrestrial network 148. In some other embodiments, the distant ground station 146 may be coupled to the terrestrial network 148.

The system 100 can further have a signal processing site (SPS) 150. The SPS 150 can have one or more processors, modems, switches, and other electronic or electrical equipment that can perform signal combining, signal switching, and other signal processing tasks as described herein.

In some embodiments, the SPS 150 can switch one or more signals between the RFTs 112, 114, 116 to optimize uplink power margins and avoid transmitting in suboptimum conditions (e.g., weather, antenna malfunctions, etc.). In some embodiments, the SPS 150 can be a standalone system. The SPS 150 can also be collection of subsystems that is coupled to the ground stations 140, 142, 144 via the terrestrial network 148. In some other embodiments, the SPS 150 can be collocated with one of the ground stations (e.g., the ground station 144), and transmit/receive signals from one or more of the connected ground stations 140, 142, 144.

Each of the ground stations 140, 142, 144, 146 can have certain devices such as upconverters, downconverters, modems, or multiple processors, for example, capable of transforming and encapsulating or otherwise encoding raw satellite communication transmissions for transmission over a digital network. In some examples, the ground stations 140, 142, 144, 146 can encode the raw signals in a downconverted form without decoding the information in the signal for packetized transfer via internet protocol (IP) communications. For example, the signal 132 can be received at the antenna 104, downconverted to IF, digitized (e.g., encapsulated), and sent via the terrestrial network 148 to one of the other connected ground stations, 140, 144.

Such systems can be referred to as digital IF systems. Digital IF is a process for digitizing a signal at IF (Intermediate Frequency) or radiofrequency (RF) and sending the signal via internet protocol (IP) packets over a digital or packet switched network, and then either reconstituting the original signal or processing the signal from the packetized in-phase and quadrature (I/Q) representation of the analog RF data. In this regard, digital IF systems can be signal transport systems over IP networks. The received analog RF signal can be converted to an IF digital format, and transmitted, reformatted, combined with other signals, and/or routed in ways (e.g., via a packet switched network) not otherwise compatible with analog signals alone. The analog signals can then be faithfully reconstructed from the digital data stream. In such systems the digital IF information may not contain decoded or demodulated information from the related RF signals. That is, portions of the signal are captured and encoded/encapsulated for transport via a packet switched network, but the data modulated on the analog signal is not demodulated or decoded. Some such IF packetized data transmission methods and systems may be those disclosed by U.S. Pat. No. 9,577,936, which is hereby incorporated by reference in its entirety.

The composite signal 136 may be subject to different forms and levels of interference than the signal 132 and the signal 134 due to different operating environments affected by, among other things, weather patterns, geographic features, etc. In some embodiments the composite signals 132, 134, 136 may further encounter varying amounts of interference. In other embodiments, the one or more signals 122, 124 found within the composite signals 132, 134, 136 may also be referred to herein as constituent signals. Two modulated signals transmitted together may also be considered an additional modulation, also referred to herein as an intermodulation. Thus, for example, the signal 122 and the signals 124 may be referred to as constituent signals of the composite signal 136. An intermodulation can have two or more signals modulated together. Intermodulation can occur when a plurality of signals is amplified and mix together. In order to prevent intermodulation, the amplification of one or more of the constituent signals may be reduced (e.g., power backoff). For example, when amplifying multiple signals together, the power may be reduced (by e.g., 2 dB or more) in order to reduce the instance or effects of intermodulation. In general, as additional signals are amplified together, further back off may be necessary to limit the effect of intermodulation until the amplifier is well into its linear region of operation.

In some embodiments, in order to maximize the use of the available frequency spectra, the signal 122 and the signals 124 may use the same or similar bandwidth. In some embodiments, the signal 122 and the signals 124 may have the same amplitude. In some other embodiments, the signal 122 and the signals 124 may differ slightly in one or more of bandwidth, phase, and amplitude. Accordingly, the ground stations 140, 142, 144 may accidentally or intentionally utilize similar frequencies, bandwidths, and power levels (e.g., amplitude) to transmit their respective signals ($T_1$, $T_2$, $T_3$) for example, the signal 122 and the signals 124. Thus, the ground station 144 may receive the signal 122 and the signals 124 having a significant or complete frequency overlap between the received signals. In some embodiments, there may be more than two overlapped signals. The overlap of two or more signals of interest may present the ground station 144 with certain problems requiring separation and parsing of overlapped and possibly interfering signals, for example the signal 122, and the signals 124. However ground stations (e.g., the ground station 142 having multiple antennas 102, 104, 106, 316 of FIG. 3) can implement antenna diversity and signal combining to, for example, increase SNR and optimize signal reception.

Modulation as described herein may include, but not be limited to analog or digital modulation. Some of the modulation schemes referenced herein can include but not be limited to quadrature amplitude modulation (QAM), phase shift keying (PSK), binary PSK (BPSK), quadrature PSK (QPSK), differential PSK (DPSK), differential QPSK (DQPSK), amplitude and phase shift keying (APSK), offset QPSK (OQPSK), amplitude shift keying (ASK), minimum-shift keying (MSK), Gaussian MSK (GMSK) among other types of modulation, time division multiple access (TDMA), code division multiple access (CDMA), orthogonal frequency division multiple access (OFDMA), and continuous phase modulation (CPM). Certain modulation types such as for example QAM and APSK may also differ in modulus, for example, 4QAM, 8QAM, and 16APSK, to name a few.

Figure 2:
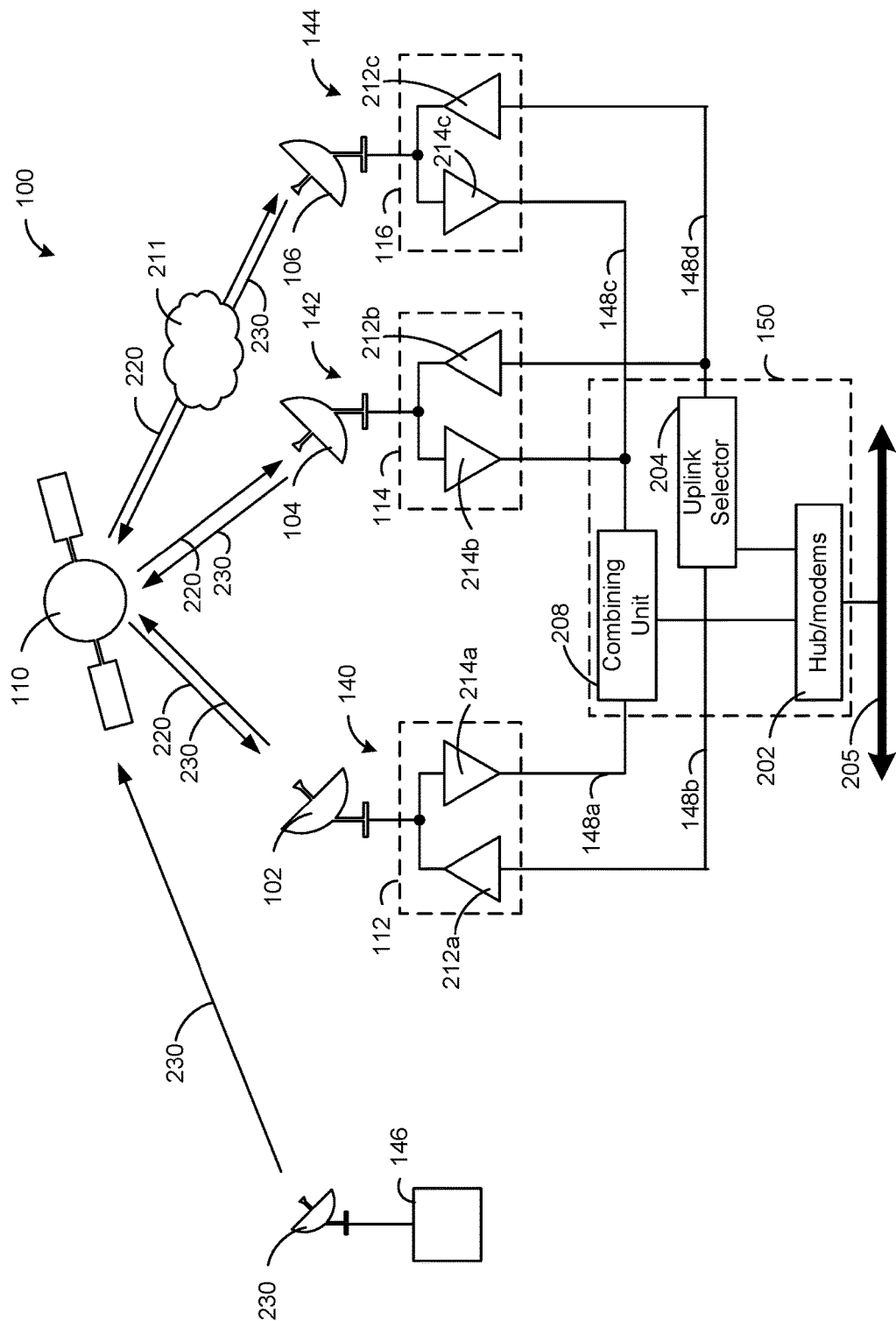
FIG. 2 is a graphical representation of an embodiment of the system of FIG. 1 using satellite antenna diversity.

FIG. 2 is a functional block representation of an embodiment of the system of FIG. 1 using satellite antenna diversity and transmit power management. Antenna diversity or site diversity, as related to satellite communications, can leverage multiple antennas at different geographical locations, but all within the same beam coverage from the satellite 110, to maximize transmit opportunities and minimize interference or attenuation caused by various environmental or various operational factors. The ground stations 140, 142, 144 may be in the same satellite beam, while the distant ground station 146 may be in the same or a different satellite beam. In some embodiments, the antenna/RF systems can implement digital IF technology to allow physical or geographic separation between the antenna/RF systems and the signal processing (hub/modem) systems. In addition, received signal strength can also be improved by using the multiple antennas and signal combination at the digital IF packet level.

The SPS 150 can have can have a transmit chain and a receive chain communicatively coupled to the RFTs 112, 114, 116. The transmit chain and the receive chain can share certain components. For example, in the transmit chain, the SPS 150 can have a hub 202, and an uplink selector 204. In the receive chain, the SPS 150 can have a combining unit 208, and the hub 202. For ease of description, the various components are described herein as performing specific functions associated with transmission and reception and processing of signals in the SPS 150. However in some embodiments a processor, a CPU, or multiple distributed processing units (see below description of FIG. 5), or cloud computing, may actually perform the described function.

Transmit data can be any data that is to be modulated and transmitted via the system 100 and the satellite 110. The transmit data can be Internet Protocol (IP) data, such as TCP/IP data, from the Internet or other applicable network, for example.

A downlink signal 220 can have modulated data received at one or more of the ground stations 140, 142, 144. The downlink signal 220 can have multiple downlink subchannels. The downlink signal 220 can be transmitted by a remote ground station (e.g., the remote ground station 146) or from different remote ground stations or some combination thereof. In the receive chain, the downlink signal 220 can be received, downconverted to IF, and digitized. Using signal diversity, multiple of the antennas 102, 104, 106 can receive the same downlink signal 220, and determine certain channel state information or transmission channel quality can be gleaned from digital combination of the digital IF versions of the downlink signal. This is described in more detail below.

An uplink signal 230 can have modulated data (e.g., modulated transmit data) intended for reception at a distant location, via the satellite 110. The uplink signal 230 can have multiple uplink subchannels. Each uplink signal carries a modulated version of a corresponding transmit data. Thus in some embodiments, each uplink signal can have a content stream corresponding to the associated downlink signal. For example, the SPS 150 can transmit the uplink signal 230 via one or more of the RFTs 112, 114, 116. In some embodiments, the SPS 150 can switch different uplink signals or subchannels via one or more of the RFTs 112, 114, 116 based on downlink channel (e.g., environmental) conditions at a given RFT. The uplink signals (or subchannels) can be all being transmitted to remote terminal 146 or different remote terminals, or multiple remote terminals, or some combination thereof.

Receive Chain

In some embodiments, the RFTs 112, 114, 116 can each have a low noise amplifier (LNA) 214 (shown as LNAs 214a, 214b, 214c) communicatively coupled to the antennas 102, 104, 106 in the receive chain. In some examples, the downlink signal 220 and/or one or more of the respective downlink signals (or subchannels) can be received at the antennas 102, 104, 106, from the remote ground station 146 via the satellite 110. The LNAs 214 can amplify the downlink signals received at the antennas 102, 104, 106 from the satellite 110.

The RFTs 112, 114, 116 can have downconverters coupled to the LNAs 214. The downconverters can downconvert the downlink signal 220 (e.g., the downlink subchannels) to IF bands for heterodyne reception. In the receive chain, the downconverters can be coupled to signal modifiers (not shown) that can digitize or encapsulate the IF signals and packetize the analog IF signals as digital IF signals. The encapsulation can include sampling the amplified and downconverted downlink subchannels (e.g., the analog IF signals) at a high rate, and then transmitting the sample data as packets over a packet switched network such as the terrestrial network 148.

The SPS 150 can have a combining unit 208. In some embodiments, the combining unit 208 can receive all of the different versions of all incoming downlink signals 220 (or downlink subchannels) from all of the RFTs 112, 114, 116 to combine the signals to increase the received signal-to-noise ratio. Alternatively, the functions of the combining unit 208 can be performed by the hub 202 and associated processors or CPU.

The combining unit 208 can digitally combine the amplified, downconverted, and digitized downlink signals to maximize the combined SNR and enhance data throughput and resiliency of the network. In some embodiments, the combining unit 208 can measure the incoming digitized signals, to determine various characteristics (e.g., frequency, amplitude, phase, etc.) align them in frequency and phase, and digitally combine them to maximize the combined signal SNR and thus maximize the data throughput. This can be performed in real-time. The real-time measurements of the incoming signals are also used to understand impact of weather 211 and other related conditions that impact signals transmission. The uplink selector 204 can use such channel information to optimize the uplink performance in response to the real-time conditions as measured by the combining unit 208. The impact assessment on the signals can determine where the signals are being impacted, whether on the uplink to the satellite or the downlink from the satellite to the antenna based on which of uplink signals will experience the impact. The uplink selector 204 can implement this information to switch transmit subcarriers or different signals between power amplifier/antennas pairs to maximize the system performance based on real-time link conditions. The system 100 can have power amplifiers 212 (shown as PA 212a, PA 212b, PA 212c).

In some examples, if all portions (e.g., subchannels) of the downlink signal 220 are received at the antennas 102, 104, 106 and only the antenna 106 has a degraded SNR on all of the subchannels, then it may be concluded that weather 211 is attenuating or otherwise affecting the signals received at the RFT 116. In another example, if the RFTs 112, 114, 116 are sufficiently geographically separated, and the SNR of some or all of the versions of the downlink signal 220 received at all of the antennas 102, 104, 106 are degraded, that can reveal information about the quality of the link conditions from the remote ground station 146, assuming some or all of the versions of the signal 220 are coming from that site.

The hub 202 can have one or more associated modems, signal processing systems, and other computing systems (e.g., signal modifiers) configured to, for example, convert the analog IF version of the received signals into IP data streams (e.g., TCP/IP data) for transport via a larger backbone 205. The backbone 205 can be the Internet or other wide area network (WAN).

Transmit Chain

The transmit chain can include components and circuitry for conveying transmit data to the satellite 110 from multiple antennas using transmit power management. In some embodiments, the RFTs 112, 114, 116 can each have a power amplifier PA) 212 (shown as PAs 212a, 212b, 212c) communicatively coupled to the respective antennas 102, 104, 106 in the transmit chain. In some embodiments, the uplink signal 230 can originate at the SPS 150 based on modulated transmit data. The transmit data can be transformed a number of times by components of the transmit chain for efficient switching, routing, and transmission from the SPS 150 to the RFTs 112, 114, 116. The transmit data can be transformed (e.g., by one or more signal modifiers) and transported individually between the SPS 150 and the selected RFTs as digital IF data streams and then converted back to an analog signal, upconverted, and amplified prior to transmission as the uplink signal 230 to the satellite 110 via the associated antenna(s).

In the transmit chain, the hub 202 can transform, or otherwise modulate, the transmit data into modulated analog signals (e.g., modulated data on a carrier signal). The hub 202 can be configured to, for example, convert embedded IP data streams (e.g., the transmit data or TCP/IP data) received from the backbone 205 into analog IF signals in the transmit chain.

In some embodiments, the hub 202 can receive the transmit data as internet protocol (IP) packet data (data streams) from the backbone 205 for transmission via the ground stations 140, 142, 144 to the satellite 110. Each data stream of transmit data can, through the methods disclosed herein, become the uplink signal 230 or at least a portion (e.g., a subchannel) of the uplink signal 230. The transmit data can arrive at the hub 202 as TCP/IP packets, or other types of packet or IP data. The hub 202 can, via one or more modems in the hub 202, modulate the transmit data into one or more analog signals. In some examples the analog signals can be a modulated IF signal, such as L-band.

The hub 202 can be interfaced or otherwise communicatively coupled to one or more the signal modifiers to enable transmission and switching of the analog signal for transmission as network packets. This can result in the digital IF form of the transmit data. The network packets can be easily switched between the coupled RFTs 112, 114, 116. On the receiving end, the packet data can be reformed into the original analog signal with minimal loss. This digital IF transformation can allow fast and efficient sourcing for site diversity between the SPS 150 and RTFs 112, 114, 112, such that the switching of signals to optimize performance causes minimal bit errors.

The uplink selector 204 can further be coupled to the RFTs 112, 114, 116 via portions of the terrestrial network 148. Different portions of the terrestrial network 148 are labeled with letters indicating separate portions, such as the terrestrial network portions 148a, 148b, 148c, 148d. The uplink selector 204 can then switch between ground stations 140, 142, 144 (or more particularly, the RFTs 112, 114, 116) to provide the digital IF form of the transmit data as portions of the uplink signal 230 to one or more of the coupled RFTs to optimize the performance of the amplifiers (e.g., the PAs 212) given the signal conditions.

In some embodiments, the uplink selector 204 can perform switching of the digital IF version of the uplink signal 230 (e.g., the uplink subchannels) for transmission via one of the RFTs 112, 114, 116 within the transmit chain. This can maximize performance of the amplifiers (e.g., the PAs 212) on the uplink so that an optimum number of the uplink signals or subchannels are transmitted per RFT/antenna. This can minimize the number of signals transmitted via a given amplifier to maximize the amplification power provided per signal and reduce the amount of power back-off required in the amplifier (PAs 212) to limit the size of the intermodulations signals created by amplifying multiple signals in the same amplifier (e.g., the PAs 212). For example, if an amplifier is transmitting one carrier and operating at full power with no intermodulation distortion (IMD) created, then with X Watts of power available (where X the maximum rate power of the amplifier), all of the power is available to transmit the single carrier or signal/subchannel. If the RFT is transmitting two carriers, only $(X-Y)/2$ Watts are available for each carrier (where Y is the back-up required to limit intermodulation distortion), reducing the link margin and therefore the link availability. As the number of carriers or signals per RFT increases, the backoff required (Y) also increases. In another example, it might be optimum because of the data throughput needs of the signals and the RFT capabilities that under clear sky and perfect equipment operating conditions to have two uplink subchannels be transmitted through RFT 114, have a third uplink subchannel transmitted through RFT 114, and have a fourth uplink subchannels transmitted through RFT 116.

Thus, in some embodiments, it may be beneficial and most efficient to transmit only a single uplink subchannel via a single RFT. In such an embodiment, there may be an equal number of uplink subchannels to RFT-antenna pair. However any combination is possible as long as there is more than one RFT and more than one subcarrier or uplink subchannel. The same can be accomplished with different versions of the same uplink signal 230, for example.

The SPS 150 can, via the uplink selector 204, switch the digital IF stream relating to each subcarrier or uplink subchannel between the various RFTs 112, 114, 116 and the corresponding antennas 102, 104, 106. The antennas 102, 104, 106 can be, for example, a number of smaller antennas, rather than a single large antenna, or even antennas of different size and RFTs of different performance levels. This may be valuable because the cost of the RFT can increase with the size of the antenna and the size of the amplifiers. As described herein, using transmit power management, a single large antenna can be replaced by multiple smaller antennas while increasing efficiency, signal fidelity, signal resilience to weather (and other system-level problems such as component failure), and (data or communication) throughput. Accordingly, having multiple smaller antenna and amplifier systems can in many cases reduce cost of implementation over deployment of a single large antenna and amplifier system.

In some embodiments, the SPS 150 can receive information related to various environmental factors at the antennas 102, 104, 106 from the combining unit 208. For example, as the downlink signal 220 is received at the antennas 102, 104, 106, the SPS 150 can determine variations in the SNR of each version of the downlink subchannel or the entire downlink signal 220 received. In one example, if the version of the downlink signal 220 received at the antenna 106 is degraded in comparison to versions of the downlink signal 220 received at the other antennas 102, 104, then the assumption can be made that there reception issues at the antenna 106, perhaps caused by the weather 211. As a result, it can then be known that the uplink capability of the RFT 116 and the antenna 106 may be degraded. As a result, SPS 150 can optimize signal routing and amplifier settings to maximize the system throughput, and prioritize the priority or at least more important traffic in spite any system degradation due to weather or component failure. If, on the other hand, some or all of the received versions of the downlink signal 220 have a degraded SNR or quality (e.g., only those transmitted from remote ground station 146), then it can be surmised that the transmission from the remote ground station 146 that could have the issue, such as a weather related degradation in performance. In a complex network, with two or more RFT sites being combined/coordinated to provide the hub/gateway earth station capability communicating with 100s or even 1000s of remote terminal sites, it can be seen how this real-time status information on the link performance from weather and other environmental impacts can be used to optimize the network performance.

Accordingly, the uplink selector 204 can determine, based on the reception characteristics of the downlink signal 220 and/or respective downlink subchannels, which is the optimum RFT/antenna for transmitting each uplink signal or subchannel. This can maximize the throughput of the entire system 100 and/or ensure the throughput of the highest priority signals. Alternatively, this can be a function performed by the hub 202 or a related network management or traffic management system. In some embodiments, there may be a single RFT selected for each version of the uplink signal 230, for example, under clear sky conditions. In this way, all the useable power from the uplink amplifier (e.g., the PAs 212) can be allocated to one carrier, thus maximizing the available link margin. It should be appreciated that in the described system 100, a fourth RFT would be needed and can be implemented to provide a one-to-one matching of the signals 220 to the RFTs.

In the transmit chain, if the weather 211 that would negatively affect the transmit signal at the antenna 106 is expected or present, the uplink selector 204 can instead route one or more of the versions of the uplink signal or the uplink subchannels via the antenna 104 or the antenna 102 instead of using the antenna 106.

In such an example, the uplink selector 204 can communicate the appropriate digital IF signals to the RFT 112 or the RFT 114 instead of the RFT 116 due to the weather 211. This switching can also be accomplished in response to equipment failure, earthquake, strike, conflict, etc. or other reason that makes the site unavailable for uplink.

Weather 211

Figure 3:
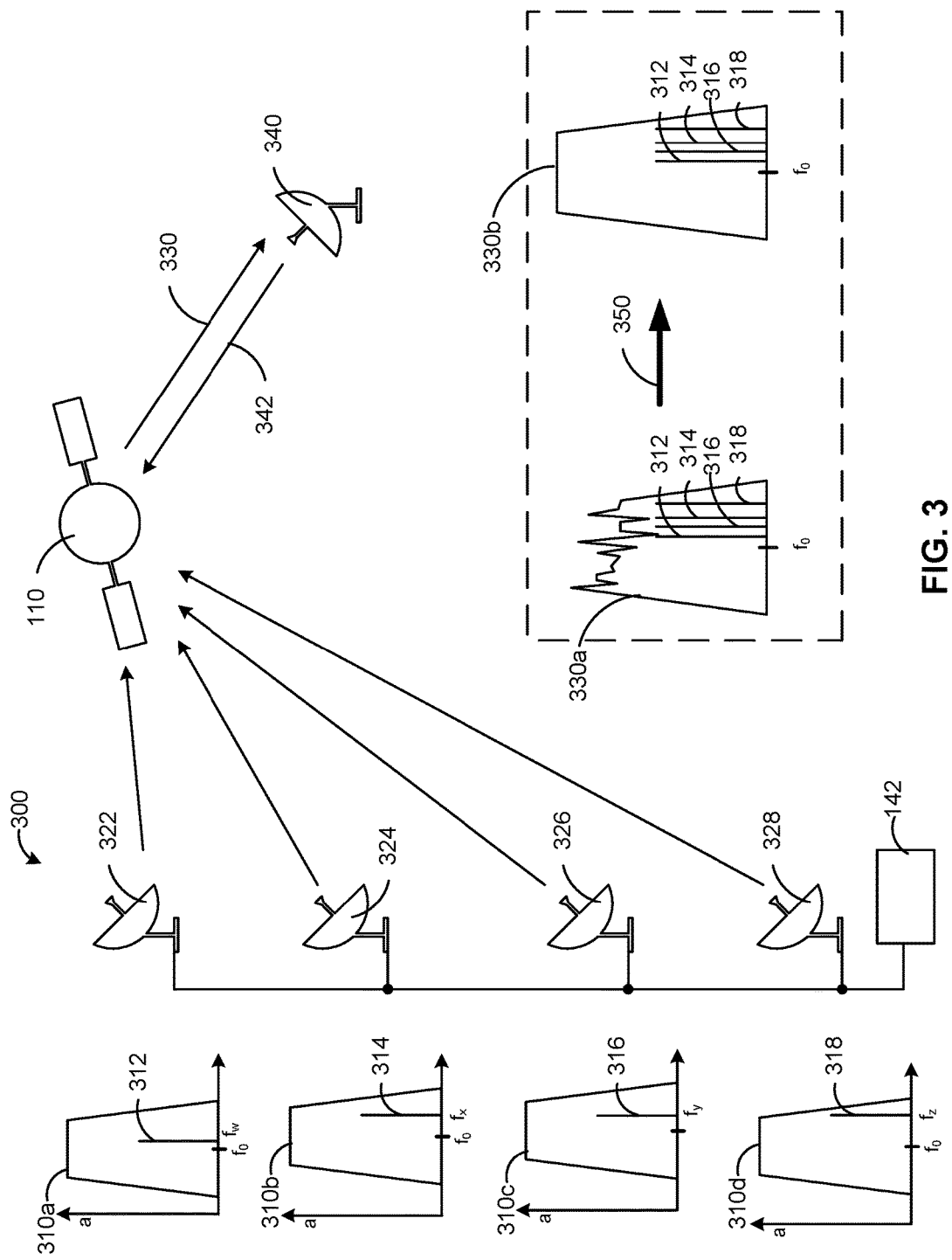
FIG. 3 is a graphical representation of another embodiment of the system of FIG. 1 using satellite antenna diversity.

FIG. 3 is a graphical representation of another embodiment of a portion of the system of FIG. 1 using satellite antenna diversity. A satellite communication system (system) 300 can have multiple antennas 322, 324, 326, 328. The antennas 322, 324, 326, 328 can be similar to the antennas 102, 104, 106, of FIG. 1 or any of the antennas described in connection with FIG. 2, for example. The antennas 322, 324, 326, 328 can be coupled to the SPS 150, or in other embodiments, the ground station 142 and a respective RFT (not shown in this view), similar to the RFTs 112, 114, 116 (FIG. 1).

Similar to above, the system 300 can implement site diversity and signal combining. In addition to using site diversity on the downlink as in the system 100 (FIG. 1 and FIG. 2), the system 300 can also implement transmission signal combining on the uplink, from the diverse antennas 322, 324, 326, 328 to make the combined signal at the satellite 110, for example.

In some embodiments, the antennas 322, 324, 326, 328 can each transmit the same signal 310, similar to the uplink signal 230 (or different versions of the same signal) to the satellite 110, for example. The signal 310 is depicted as four different iterations of the same signal 310a, 310b, 310c, 310d (collectively, signals 310). Only four exemplary versions of the signal 310 are shown, however, signal combining can be accomplished with two or more versions of the signal (e.g., the signal 310).

The signals 310 are represented in the frequency domain in terms frequency (f) and amplitude (a) (e.g., power). As shown, the antenna 322 can transmit the signal 310a, the antenna 324 can transmit the signal 310b, the antenna 326 can transmit the signal 310c, and the antenna 328 can transmit the signal 310d. However, without phase control, when the signal 310 arrives at the satellite 110 that can be as far away as Geostationary orbit (e.g., roughly 36,000 kilometers (km) above the earth and constantly moving), the frequency and phase of each of the transmitted versions of the signal 310 may be mismatched, mutually interfering, and/or subject to destructive interference.

In some embodiments, the ground station 142, applicable RFT, or other components associated with the antennas 322, 324, 326, 328 can include a continuous wave (CW) signal that piggybacks (e.g., as a subchannel) on the transmitted signal. The CW signal is referred to herein as a CW piggyback signal. Thus, each of the signals 310a, 310b, 310c, 310d are different versions of the same signal 310 having a CW piggyback signal having a discrete frequency. As shown, the signal 310a can have a CW piggyback signal 312, the signal 310b can have a CW piggyback signal 314, the signal 310c can have a CW piggyback signal 316, and the signal 310d can have a CW piggyback signal 318. Each of the CW piggyback signals 312, 314, 316, 318 can have a respective center frequency $f_w$, $f_x$, $f_y$, $f_z$, that is offset from the center frequency $f_0$ of the signal 310. Each of the CW piggyback signals 312, 314, 316, 318 can be unique to the respective signal 310. This can make the CW frequency easier to regenerate at the receive end of the transmission chain. In some other embodiments, the CW piggyback signals can have any frequency separation as needed. In some examples, the CW piggyback signals can be 1 MHz separation from each other and from antenna to antenna. Some minimum frequency separation may be preferable for later separation of the CW signals and their associated versions of the signal 310. Such a frequency offset can prevent some interference between the CW piggyback signal and the signal 310, for example. In some embodiments, the CW piggyback signals 312, 314, 316, 318 can have the same amplitude. Thus, if there is a difference in amplitude of the signals 310 received at the satellite, this can indicate a transmission problem such as rain fade from one or more antennas. In some embodiments, the CW piggyback signals 312, 314, 316, 318 can vary in amplitude.

In some embodiments, the CW piggyback signals can be a low level CW signal that is phase locked to the symbol rate of the signals 310a, 310b, 310c, 310d. As used herein, phased locked can refer to the phase relationship between the CW piggyback signal and the transmit signal 310. The phase of the CW piggyback signal 312 can be measured relative to CW piggyback signal 314, to determine adjustments for the timing or phase of the carrier signals associated with the signals 310. This can ensure the signals 310 are in phase and additive when received as a combined signal at the satellite 110.

In some embodiments, the CW piggyback signals can be, for example, a submultiple of the clock frequency of the signal 310. For example, a different submultiple at each site yields a different frequency of CW, hence each site can be uniquely identified. The CW piggyback signal can be positioned (e.g., transmitted) at a frequency that is offset from the center frequency of the carrier (e.g., $f_0$). So for any given transmission site, a unique, phase-locked CW piggyback signal can be inserted into the signals 310a, 310b, 310c, 310d on a per-site, or per antenna (e.g., the antennas 322, 324, 326, 328) basis, each with a unique frequency. The phase of the CW piggyback signals is related to the carrier data phase of the respective transmit signals 310, and remains constant.

The signals 310 can be individually and collectively received at the satellite 110 and relayed to the ground station 340 (e.g., an antenna and an RFT) as a downlink signal 330. Without phase or amplitude adjustment, the downlink signal 330 may have all received versions of the signals 310a, 310b, 310c, 310d, mismatched in phase. A downlink signal 330a (see FIG. 3 inset) shows an exemplary overlapped representation of the various transmissions of the signals 310 received at the satellite 110 and relayed to the ground station 340. The illustrated example downlink signal 330a depicts how the signals 310 received at the satellite 110 out of phase can be destructively interfering.

However, during transmission from the antennas 322, 324, 326, 328 (or reception at the ground station 340), the ground station 340 can monitor and determine the relative phase and/or phase shifts of each of the CW piggyback signals 312, 314, 316, 318. The ground station 340 can then determine each of the phase offsets (the phase difference between the received versions of the signals) for each of the CW piggyback signals based on the information embedded in the carrier of each of the signals 310. The ground station 340 can detect the CW piggyback signals 312, 314, 316, 318 and correlate them to the respective signals 310a, 310b, 310c, 310d. The correlation between the respective transmit signals 310 and the CW piggyback signals can be a predetermined relationship, known at the ground station 340. The ground station 340 can further measure certain variations in amplitude to account for any uplink issues encountered during transmission, such as rain fade or other attenuation or obscuration. This information can be use to to optimize the overall link performance by controlling the uplink power from each site.

Based on the phase offsets (and e.g., amplitude variations), the ground station 340 can transmit one or more adjustment messages 342 back to each of the antennas 322, 324, 326, 328 (and their respective RFTs and ground stations). The adjustment messages 342 can include instructions to adjust for, and control the relative delay of each of the signals 310a, 310b, 310c, 310d from their respective antennas, using a delay line, for example. Such instructions, or adjustment message, can include a time correction, for example. Changing the time delay on the ground results in changes in phase of the transmit signals 310 for signal combining at the satellite 110. The one or more adjustment messages 342 can indicate to each of the antennas 322, 324, 326, 328 and their respective control systems to insert or adjust a time delay or phase delay to align the signals 310 so as to arrive at the satellite 110 at the same time in a phase-aligned manner. The delay can be inserted by a delay line or other timing correction performed by the SPS 150 or appropriate processors at the RFT, for example. The phase can be aligned in the time domain so that the signals 310 constructively add and improve the signal to noise ratio.

The phase adjustment process 350 can include aligning the phases of each respective signal 310, prior to transmission to the satellite 110, by passing the signal 310 through a delay line. The increments of the delay are increments of the clock cycle that is fast enough and accurate enough to align 30 GHz, ($3 \times 10^{-11}$ s). Thus after a phase adjustment process 350 the signals 310 can be aligned in phase to constructively combine at the satellite 110 and form a phase-aligned version 330b of the downlink signal 330. The transmission of multiple versions of the signal 310, discrimination of relative phase offset or phase lag of the respective CW piggyback signals can provide feedback information to the ground station 142 to adjust the phase of the transmitted signals 310a, 310b, 310c, 310d. The feedback loop provides the phase adjustment process 350 to allow for uplink site diversity.

In some embodiments, the phase adjustment process 350 can include determining a center frequency of each of the CW piggyback signals 312, 314, 316, 318, for example, the ground station 340. The ground station 340 (or applicable processors or controllers) can determine a phase offset between the CW piggyback signals and determine a time delay required for each of the transmitting antennas. This information can be included in the one or more adjustment messages 342.

Figure 4:
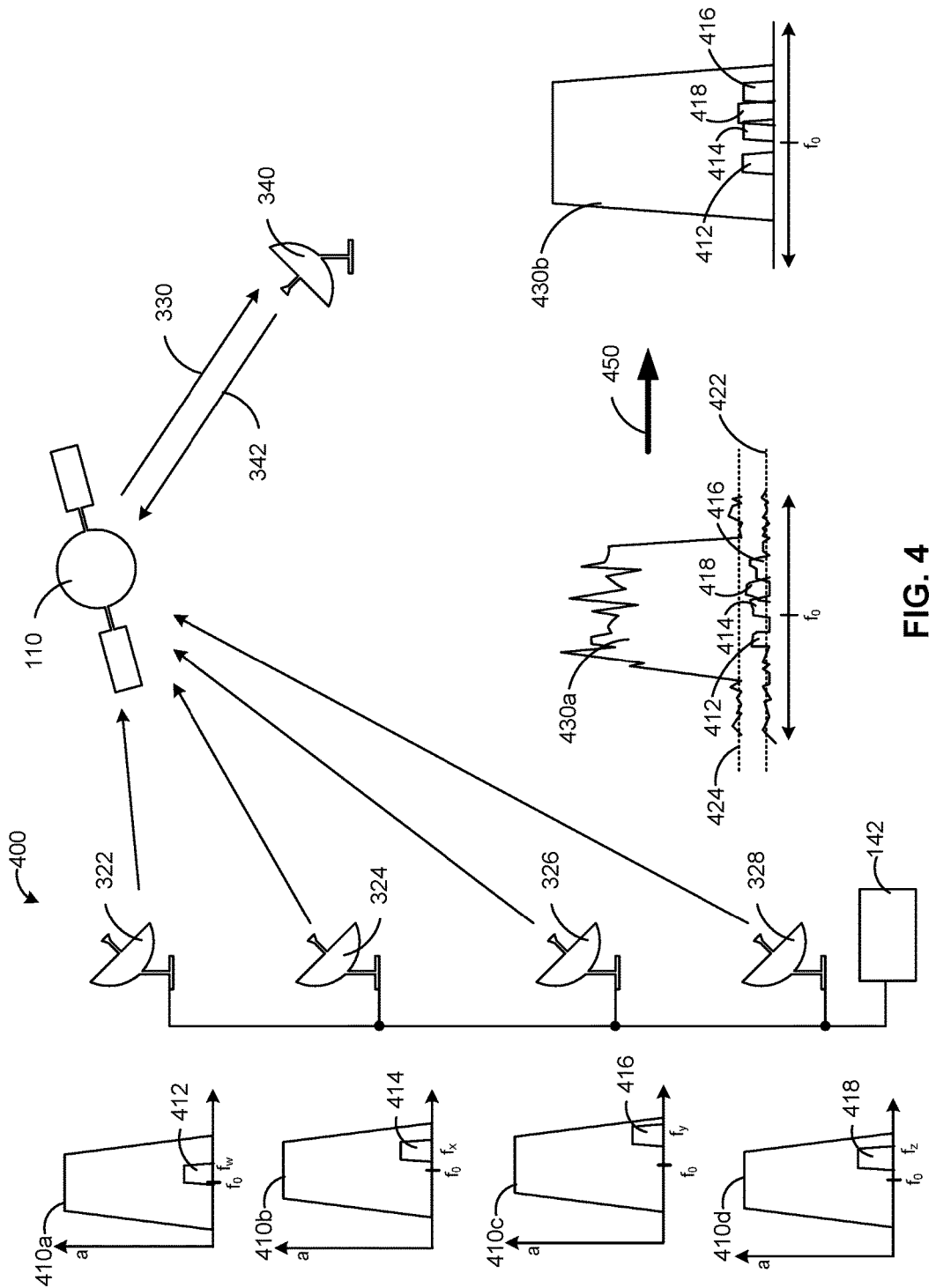
FIG. 4 is a functional block representation of another embodiment a portion of the system of FIG. 1 using satellite antenna diversity.

FIG. 4 is a graphical representation of another embodiment a portion of the system of FIG. 1 using satellite antenna diversity. A satellite communication system (system) 400 can have the multiple antennas 322, 324, 326, 328, and implement site diversity and signal combining similar to the system 300 (FIG. 3).

In some embodiments, the antennas 322, 324, 326, 328 can each transmit the same signal 410 (or different versions of the same signal) to the satellite 110, similar to the signal 310, for example. The signal 410 is depicted as four different iterations or versions of the same signal 410a, 410b, 410c, 410d (collectively, signals 410). Only four exemplary versions of the signal 410 are shown, however, signal combining can be accomplished with two or more versions of the signal (e.g., the signal 410).

The signals 410 are depicted in the frequency domain in terms frequency (f) and amplitude (a) (e.g., power). As shown, the antenna 322 can transmit the signal 410a, the antenna 324 can transmit the signal 410b, the antenna 326 can transmit the signal 410c, and the antenna 328 can transmit the signal 410d. However, as above, without phase control, when the signal 410 arrives at the satellite 110, the frequency and phase of each of the transmitted versions of the signal 410 may be mismatched, mutually interfering, and/or subject to destructive interference.

In some embodiments, the ground station 142, applicable RFT, or other components associated with the antennas 322, 324, 326, 328 can include a spread spectrum signal that piggybacks on the transmitted signal. The spread spectrum (SS) signal is referred to herein as a SS piggyback signal in a similar manner to the CW piggyback signal above. Thus, each of the signals 410a, 410b, 410c, 410d are different versions of the same signal 410 having a SS piggyback signal having a discrete frequency range. As shown, the signal 410a can have a SS piggyback signal 410, the signal 410b can have a SS piggyback signal 414, the signal 410c can have a SS piggyback signal 416, and the signal 410d can have a SS piggyback signal 418. Each of the SS piggyback signals 412, 414, 416, 418 can have a respective center frequency $f_w$, $f_x$, $f_y$, $f_z$, that is offset from the center frequency $f_0$ of the signal 410. The center frequency of the SS piggyback signals can be the center of the respective frequency band over which the SS piggyback signal is spread.

Each of the SS piggyback signals 412, 414, 416, 418 can identify the RFT from which it was sent. In some embodiments, the SS piggyback signals 412, 414, 416, 418 can be unique to the respective signal 410. For example, the content of each of the SS piggyback signals 412, 414, 416, 418 can have unique content (e.g., a distinct repeating pattern, for example) or a distinct spreading code. Each of the SS piggyback signals 412, 414, 416, 418 can be unique based on a different seed or seed value. This can make the spread spectrum frequency easier to regenerate at the receive end of the transmission chain. In some embodiments, this allows the various SS piggyback signals 412, 414, 416, 418 to be overlapped in frequency, as needed. Since the content and/or spreading of each SS piggyback signal is unique, even the overlapped signals can be detected. In some embodiments, the content or spreading can be tied to a specific RFT or antenna, indicating the origin of a given version of the signals 410, for example.

In some other embodiments, the SS piggyback signals can have any frequency separation as needed. In some examples, the SS piggyback signals can be 1 MHz separation from each other and from antenna to antenna. Some minimum frequency separation may be preferable for later separation of the spread spectrum signals and their associated versions of the signal 410. Such a frequency offset can prevent some interference between the SS piggyback signal and the signal 410, for example.

In some embodiments, the SS piggyback signals 412, 414, 416, 418 can have the same amplitude. Thus, if there is a difference in amplitude of the signals 410 received at the satellite, this can indicate a transmission problem such as rain fade from one or more antennas. In some embodiments, the spread spectrum piggyback signals 412, 414, 416, 418 can vary in amplitude. In some embodiments, the SS piggyback signals 412, 414, 416, 418 can be of a similar power level to that of a signal noise floor 422 (shown as a dotted line) of the transmitted signal. The signal noise floor 422 can be distinguished from, and is generally a lower power level that of a satellite noise floor 424. In some examples, the relative amplitude of each SS piggyback signal can indicate that is has become a noisy signal and should stop transmitting main carrier (e.g., the signal 410) and only transmit the associated SS piggyback signal. When the power level of the piggy back signal returns to normal, the main carrier can be switched back on.

In some embodiments, the SS piggyback signals can be a low level spread spectrum signal that is phase locked to the symbol rate of the signals 410a, 410b, 410c, 410d. For example, the spreading code of the SS piggyback signals can be a sub multiple of the carrier symbol rate of the signals 410, and thus is locked to the carrier. The phase of the SS piggyback signal 412 can be measured relative to SS piggyback signal 414, to determine adjustments for the timing or phase of the carrier signals associated with the signals 410. This can ensure the signal 410 are in phase and additive when received as a combined signal at the satellite 110.

In some embodiments, the SS piggyback signals can have, for example, a clock frequency that is a submultiple of the clock frequency of the signal 410. For example, the transmission rate of the signals 410 can be 10 Mbits per second, corresponding to the clock rate/clock frequency. The SS piggyback signals can then have a clock rate divided by a whole number that divides the clock rate of the signal 410 (10 Mbps) leaving no remainder, such as 10,000,000 divided by 10,000. The clocks are thus phase-locked to each other, so adjusting one adjusts the other. For example, a different submultiple at each site yields a different frequency of spread spectrum, hence each site can be uniquely identified. In some embodiments, the SS piggyback signals can have a different spread code, hence each site can be uniquely identified. The SS piggyback signal can be positioned (e.g., transmitted) at a frequency that is offset from the center frequency of the carrier (e.g., $f_0$). So for any given transmission site, a unique, phase-locked spread spectrum piggyback signal can be inserted into the signals 410a, 410b, 410c, 410d on a per-site, or per antenna (e.g., the antennas 322, 324, 326, 328) basis, each with a unique frequency. The phase of the SS piggyback signals is related to the carrier data phase of the respective transmit signals 410, and remains constant.

The signals 410 can be individually and collectively received at the satellite 110 and relayed to the ground station 340 (e.g., an antenna and an RFT) as a downlink signal 430. Without phase or amplitude adjustment, the downlink signal 430 may have all received versions of the signals 410a, 410b, 410c, 410d, mismatched in phase. A downlink signal 430a (see FIG. 4 inset) shows an exemplary overlapped version of the various transmissions of the signals 410 received at the satellite 110 and relayed to the ground station 440. The illustrated example downlink signal 430a depicts how the signals 410 received at the satellite 110 out of phase can be destructively interfering.

However, during transmission, the ground station 340 can monitor the relative phase and/or phase shifts of each of the SS piggyback signals 412, 414, 416, 418. The ground station 340 can then determine each of the phase offsets for each of the spread spectrum piggyback signals based on the information embedded in the carrier of each of the signals 410. The ground station 340 can detect the SS piggyback signals 412, 414, 416, 418 and correlate them to the respective signals 410a, 410b, 410c, 410d. The correlation between the respective transmit signals 410 and the SS piggyback signals can be a predetermined relationship, known at the ground station 340. The ground station 340 can further measure certain variations in amplitude to account for any uplink issues encountered during transmission, such as rain fade or other attenuation or obscuration. This information can be use to to optimize the overall link performance by controlling the uplink power from each site.

Based on the phase offsets (and e.g., amplitude variations), the ground station 340 can transmit the one or more adjustment messages 342 back to each of the antennas 322, 324, 326, 328 (and their respective RFTs and ground stations). The adjustment messages 342 can include instructions to adjust for, and control the relative delay of each of the signals 410a, 410b, 410c, 410d from their respective antennas. Changing the time delay on the ground results in changes in phase of the transmit signals 410 for signal combining at the satellite 110. The one or more adjustment messages 342 can indicate to each of the antennas 322, 324, 326, 328 and their respective control systems to insert or adjust a time delay or phase delay to align the signals 410 so as to arrive at the satellite 110 at the same time in a phase-aligned manner. The phase can be aligned in the time domain so that the signals 410 constructively add and improve the signal to noise ratio.

Thus after a phase adjustment process the signals 410 can be aligned in phase to constructively combine at the satellite 110 and form a phase-aligned version 430b of the downlink signal 430. the SS piggyback signals and the CW piggyback signals are both phase-locked to the main carrier (e.g., the signal 310, 410). Accordingly, the phase adjustment process 450 is similar to the phase adjustment process 350. The transmission of multiple versions of the signal 410, discrimination of relative phase offset or phase lag of the respective SS piggyback signals can provide feedback information to the ground station 142 to adjust the phase of the transmitted signals 410a, 410b, 410c, 410d. The feedback loop provides the phase adjustment process 450 to allow for uplink site diversity. In a similar manner to that described above, the phase adjustment process 450 can include a determination of the phase, phase offset, and/or time delay between the SS piggyback signals. Phase equates to a time difference over a distance. Thus the phase adjustment process 450 can include passing the signals through a delay line clocked at a rate that provides the necessary timing adjustments. The calculated delay can inform the necessary timing adjustments required at the RFT 142 or associated ground stations for transmission via the antennas 322, 324, 326, 328.

Figure 5:
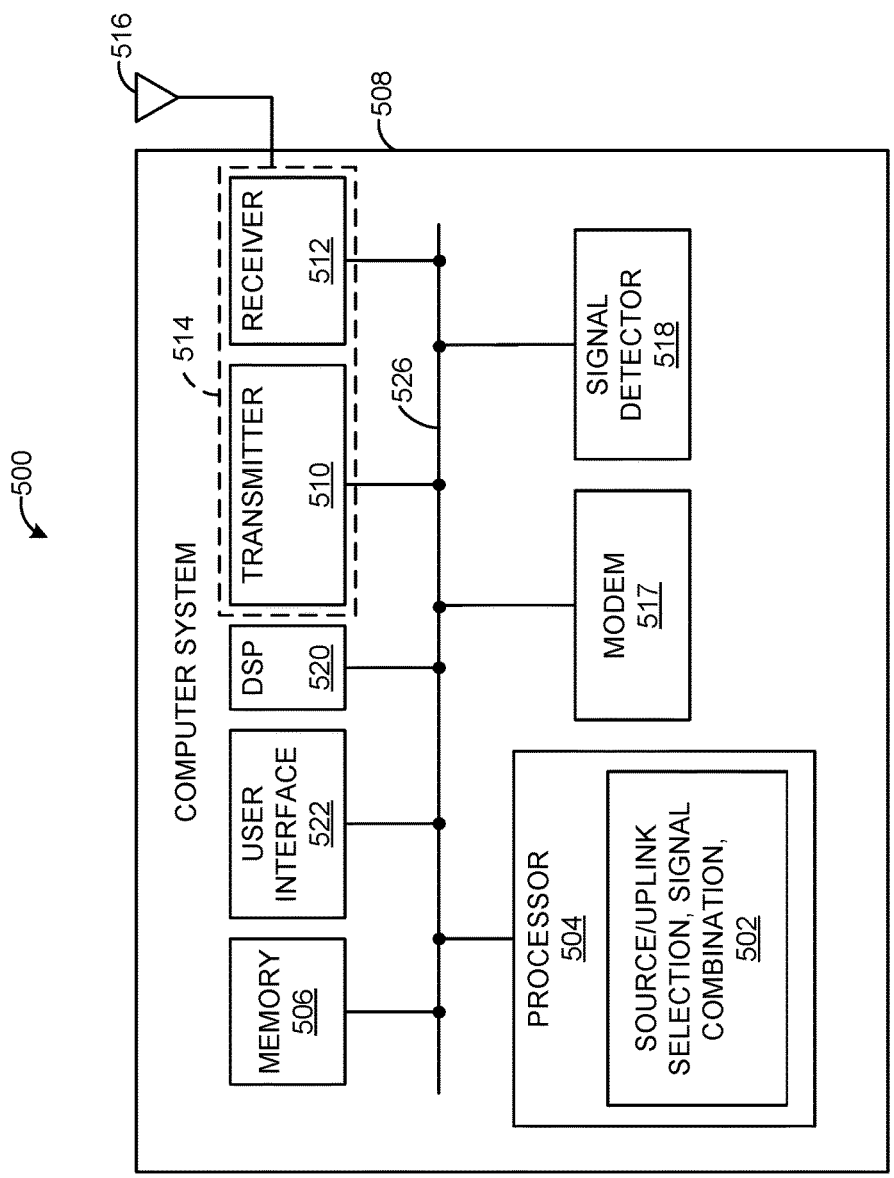
FIG. 5 is a functional block diagram of components of a communication device that may be employed within the communication system of FIG. 1 and FIG. 2.

FIG. 5 is a functional block diagram of components of a communication device that may be employed within the communication systems of FIG. 1, FIG. 2, FIG. 3, and FIG. 4. A communication device (device) 500 may be implemented as, for example, RFTs 112, 114, 116 and the associated ground stations (or RFTs) of FIG. 1, FIG. 2, FIG. 3, and FIG. 4. The device 500 can be implemented as needed to perform one or more of the foregoing processes relating to, for example, signal or phase adjustment (e.g., the phase adjustment processes 350, 450), signal combining and uplink selection. In some embodiments, the device 500 can further be implemented as the SPS 150 or one of the subcomponents of the SPS such as the hub 202, the uplink selector 204, and the combining unit 208. The device 500 may include a processor 504 which controls operation of the device 500. The processor 504 may also be referred to as a central processing unit (CPU). The processor 504 can direct and/or perform the functions, for example, attributed to the hub 202, the uplink selector 204, and the combining unit 208.

The device 500 may further include a memory 506 operably connected to the processor 504, which may include both read-only memory (ROM) and random access memory (RAM), providing instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein.

In the receive chain, when the device 500 is implemented or used as a receiving node or ground station, the processor 504 may be configured to process information from of a plurality of different signal types. In such an embodiment, the device 500 may be implemented as the hub 202 or the SPS 150, for example, and configured to receive and combine, via the combining unit 208, the downlink signals 220 and their respective downlink subchannels from the satellite 110.

In the transmit chain, for example, the processor 504 (e.g., the hub 202) can also be configured to switch, via the uplink selector 204, the uplink signal 230 and its respective subchannels between or among the RFTs 112, 114, 116 for transmission. The processor 504 may have one or more modules 502 configured to implement various processes or methods in certain switching operations during transmission or signal combination operations during reception. The modules 502 may perform the tasks of the hub 202, the uplink selector 204 and/or the combining unit 208.

The processor 504 may further include one or more adaptive equalizers (not shown). The adaptive equalizers may be configured to estimate and characterize incoming signals in the time domain.

The processor 504 may comprise or be a component of a processing system implemented with one or more processors 504. The one or more processors 504 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 504 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 504, cause the processing system to perform the various functions described herein.

The device 500 may also include a housing 508 that may include a transmitter 510 and a receiver 512 to allow transmission and reception of data between the communication device 500 and a remote location. For example, such communications may occur between and among the ground stations 140, 142, 144, 146. The transmitter 510 and receiver 512 may be combined into a transceiver 514 at an antenna site. An antenna 516 may be communicatively coupled to the housing 508 and electrically coupled to the transceiver 514 or to the transmitter 510 and the receiver 512 independently. The device 500 may also include (not shown) multiple transmitters, multiple receivers, multiple transceivers, and/or multiple antennas. In some embodiments, the transmitter 510, the receiver 512, and the antenna 516 can also perform some or all of the functions associated with the antennas 102, 104, 106, for example.

The device 500 may also include at least one modem 517 that modulate and demodulate signals transmitted and received by the transceiver 514. The modem 517 (or modems) can perform one or more functions of the hub 202, for example.

The device 500 may also include a signal detector 518 that may be used in an effort to detect and quantify the level of signals received by the transceiver 514. The signal detector 518 may detect such signals as frequency, bandwidth, symbol rate, total energy, energy per symbol, power spectral density and other signal characteristics. The signal detector 518 may also be include a "windowing module," and may further be configured to process incoming data (e.g., the signals 220) ensuring that the processor 504 is receiving a correct bandwidth-limited portion of a wireless communication spectrum in use. As a non-limiting example, certain transmissions to and from a ground station 140, 142, 144, 146 can incur certain time and frequency variations by the time the transmissions are received at the satellite 110 and rerouted to the ground station 144. Such variations may be due to Doppler shift and distance traveled, among other factors. Accordingly, the signal detector 518 (or windowing module) may correct the incoming signal(s) 136 for bandwidth and center frequency to ensure the processor 504 received the correct portion of the spectrum including the transmit signal.

The device 500 may also include a digital signal processor (DSP) 520 for use in processing signals. The DSP 520 may be configured to generate a data unit for transmission. The DSP 520 may further cooperate with the signal detector 518 and the processor 504 to determine certain characteristics of the constituent signals 220. The DSP 520 can further have one or more analog to digital converters (A2D), one or more digital to analog converters (D2A), downconverters, upconverters, and other components required for the source selection (e.g., the uplink selector 204), switching (e.g., the combining unit 208), decoding, and demodulating, for example. In some embodiments, the signal detector 518 and the DSP 520 may be contained within the processor 504.

The device 500 may further comprise a user interface 522. The user interface 522 may comprise a keypad, a microphone, a speaker, and/or a display. The user interface 522 may include any element or component that conveys information to a user of the device 500 and/or receives input from the user.

The various components of the device 500 described herein may be coupled together by a bus system 526. The bus system 526 may include a data bus, for example, as well as a power bus, a control signal bus, and a status signal bus in addition to the data bus. Those of skill in the art will appreciate the components of the device 500 may be coupled together or accept or provide inputs to each other using some other mechanism. The bus system 526 can further couple the communication device to the terrestrial network 148, for example, coupling a first device 500 (e.g. the ground station 142) to one or more second devices 500 (e.g., the ground station 144).

Although a number of separate components are illustrated in FIG. 5, one or more of the components may be combined or commonly implemented. For example, the processor 504 may be used to implement not only the functionality described above with respect to the processor 504, but also to implement the functionality described above with respect to the signal detector 518 and/or the DSP 520. Further, each of the components illustrated in FIG. 5 may be implemented using a plurality of separate elements. Furthermore, the processor 504 (or one or more processors) may be used to implement any of the components, modules, circuits, or the like described herein, or each may be implemented using a plurality of separate elements.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques, methods, or processes described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry, as described in connection with FIG. 2, FIG. 3, and FIG. 4. Such a processor may be configured to perform any of the methods described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Although embodiments of the invention are described above for particular embodiment, many variations of the invention are possible. For example, the numbers of various components may be increased or decreased, modules and steps that determine a supply voltage may be modified to determine a frequency, another system parameter, or a combination of parameters. Additionally, features of the various embodiments may be combined in combinations that differ from those described above.

The above description of the disclosed embodiment is provided to enable any person skilled in the art to make or use the invention. Various modifications to these embodiments will be readily apparent to those skilled in the art, and the generic principles described herein can be applied to other embodiment without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other embodiment that may become obvious to those skilled in the art and that the scope of the present invention is accordingly limited by nothing other than the appended claims.

What is claimed is:

1. A method for operating a radio frequency terminals (RFT) in a satellite communications system having multiple RFTs, each RFT being associated with an antenna, the method comprising:
   receiving, via a satellite from a first RFT, a first version of a transmit signal having a first piggyback signal phase-locked with a symbol rate of the transmit signal;
   receiving, via the satellite from a second RFT, a second version of the transmit signal having a second piggyback signal phase-locked with the symbol rate of the transmit signal;
   determining a phase offset between the first version of the transmit signal and the second version of the transmit signal based on a phase difference between the first piggyback signal and the second piggyback signal; and
   transmitting an adjustment message to the first RFT and the second RFT based on the phase offset, the adjustment message including a time correction for the first version and the second version.

2. The method of claim 1 further comprising receiving the first version and the second version aligned in phase, based on the adjustment message.

3. The method of claim 2, wherein the time correction comprises a time adjustment associated with transmission of the transmit signal from a respective RFT of the multiple RFTs.

4. The method of claim 1,
   wherein the first version comprises a center frequency and the first piggyback comprises a first frequency having a first offset from the center frequency, and
   wherein the second version comprises and a second center frequency having a second offset from the center frequency.

5. The method of claim 3, wherein the first piggyback signal identifies the first RFT and the second piggyback signal is unique to the second RFT.

6. The method of claim 3, wherein the first piggyback signal and the second piggyback signal each comprise a continuous wave (CW) signal.

7. The method of claim 3 wherein the first piggyback signal and the second piggyback signal comprise a spread spectrum (SS) signal.

8. A device for satellite communications using site diversity in a system having multiple radio frequency terminals (RFTs), each RFT being associated with an antenna, the device comprising:
   an antenna operable to
      receive, via a satellite from a first RFT, a first version of a transmit signal having a first piggyback signal phase-locked with a symbol rate of the transmit signal;
      receive, via the satellite from a second RFT, a second version of the transmit signal having a second piggyback signal phase-locked with the symbol rate of the transmit signal; and
   one or more processors coupled to the antenna and operable to
      determine a phase offset between the first version of the transmit signal and the second version of the transmit signal based on a phase difference between the first piggyback signal and the second piggyback signal, and
      transmit, via the antenna, an adjustment message to the first RFT and the second RFT based on the phase offset, the adjustment message including a time correction for the first version and the second version.

9. The device of claim 8 wherein the antenna if further operable to receive the first version and the second version aligned in phase, based on the adjustment message.

10. The device of claim 9, wherein the time correction comprises a time adjustment associated with transmission of the transmit signal from a respective RFT of the multiple RFTs.

11. The device of claim 8,
    wherein the first version comprises a center frequency and the first piggyback comprises a first frequency having a first offset from the center frequency, and
    wherein the second version comprises and a second center frequency having a second offset from the center frequency.

12. The device of claim 11, wherein the first piggyback signal identifies the first RFT and the second piggyback signal is unique to the second RFT.

13. The device of claim 10, wherein the first piggyback signal and the second piggyback signal each comprise a continuous wave (CW) signal.

14. The device of claim 10 wherein the first piggyback signal and the second piggyback signal comprise a spread spectrum (SS) signal.

15. A non-transitory computer readable medium comprising instructions that when executed by a processor, cause a computer to:
    receive, via a satellite from a first RFT, a first version of a transmit signal having a first piggyback signal phase-locked with a symbol rate of the transmit signal;
    receive, via the satellite from a second RFT, a second version of the transmit signal having a second piggyback signal phase-locked with the symbol rate of the transmit signal;
    determine a phase offset between the first version of the transmit signal and the second version of the transmit signal based on a phase difference between the first piggyback signal and the second piggyback signal; and
    transmit an adjustment message to the first RFT and the second RFT based on the phase offset, the adjustment message including a time correction for the first version and the second version.

16. The non-transitory computer readable medium of claim 15 further causing the computer to receive the first version and the second version aligned in phase, based on the adjustment message.

17. The non-transitory computer readable medium of claim 16, wherein the time correction comprises a time adjustment associated with transmission of the transmit signal from a respective RFT of the multiple RFTs.

18. The non-transitory computer readable medium of claim 15,
    wherein the first version comprises a center frequency and the first piggyback comprises a first frequency having a first offset from the center frequency, and
    wherein the second version comprises and a second center frequency having a second offset from the center frequency.

19. The non-transitory computer readable medium of claim 18, wherein the first piggyback signal identifies the first RFT and the second piggyback signal is unique to the second RFT.

20. The non-transitory computer readable medium of claim 18, wherein the first piggyback signal and the second piggyback signal each comprise one of a continuous wave (CW) signal or spread spectrum (SS) signal.

* * * * *